United States Patent [19]

Perry

[11] Patent Number: 4,868,885

[45] Date of Patent: Sep. 19, 1989

[54] APPARATUS AND METHOD FOR HIGH-SPEED DETERMINATION OF RECEIVED RF SIGNAL STRENGTH INDICATOR

[75] Inventor: Fred G. Perry, Lynchburg, Va.

[73] Assignee: General Electric Company, Lynchburg, Va.

[21] Appl. No.: 859,357

[22] Filed: May 5, 1986

[51] Int. Cl.$^4$ .............................................. H04B 1/60
[52] U.S. Cl. ....................................... 455/10; 455/52; 455/226
[58] Field of Search ....................... 455/33, 62, 67, 52, 455/226, 12, 69, 10, 50, 53–56, 63, 68, 70; 379/59, 60; 364/811

[56] References Cited

U.S. PATENT DOCUMENTS

| | | | |
|---|---|---|---|
| 3,983,492 | 9/1976 | Fisher et al. ........................... | 455/62 |
| 4,054,786 | 10/1977 | Vincent ................................ | 364/811 |
| 4,153,896 | 5/1979 | White .................................. | 364/811 |
| 4,352,094 | 9/1982 | Reneric ............................... | 364/811 |
| 4,527,284 | 7/1985 | Röttger ................................ | 455/33 |
| 4,549,311 | 3/1985 | McLaughlin ........................ | 455/277 |
| 4,556,760 | 12/1985 | Goldman ............................. | 379/60 |
| 4,608,711 | 8/1986 | Goldman ............................. | 379/60 |
| 4,613,990 | 9/1986 | Halpern ............................... | 455/52 |
| 4,752,967 | 6/1988 | Bustamante et al. .................. | 455/52 |

FOREIGN PATENT DOCUMENTS 8400654 2/1984 PCT Int'l Appl. ................... 379/60

Primary Examiner—Robert L. Griffin
Assistant Examiner—Curtis Kuntz
Attorney, Agent, or Firm—Nixon & Vanderhye

[57] ABSTRACT

Rapid measurement of the received signal strength indicator (RSSI) of a radio frequency signal is performed by sampling received signal amplitudes and averaging only selected ones of the sampled amplitudes. In one embodiment, two sample values obtained successively in time are compared and the larger of the two is stored, this process continuing over a desired sampling interval. Sampled values which exceed both the value obtained from an immediately preceding sample time and the value obtained from an immediately succeeding sample time are stored twice, while sample values which are less than immediately preceding and succeeding sample values are never stored. The stored values are averaged to yield an indication of average received signal amplitude. The resulting average value is very close to true average signal amplitude, is substantially unaffected by Rayleigh fading phenomenon, and yet is sensitive to rapid changes in received signal amplitude caused, for exaple, by obstacles in the signal transmission path.

22 Claims, 7 Drawing Sheets

FIG. 2  Fast RSSI Block Diagram

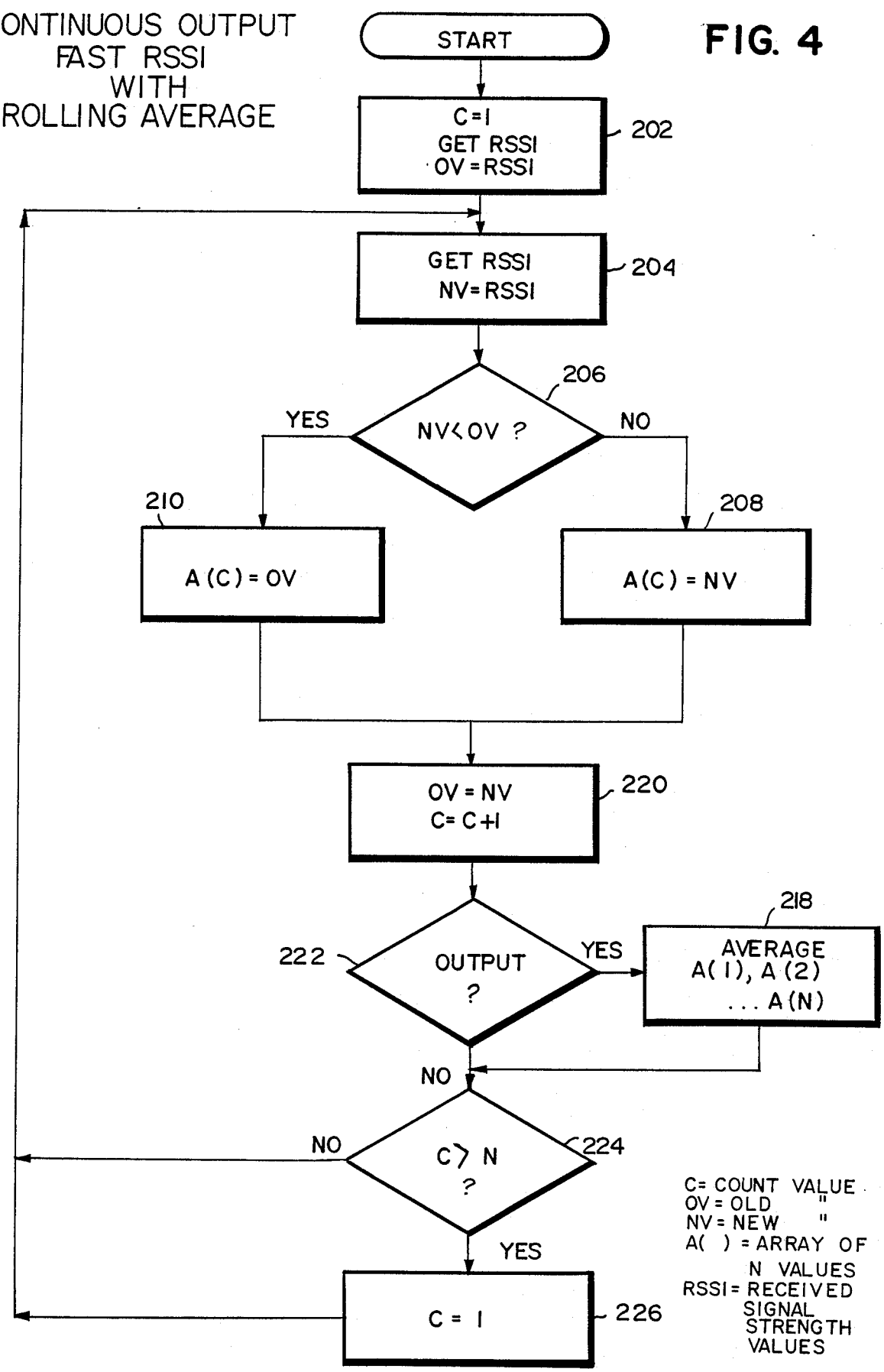

APPARATUS AND METHOD FOR HIGH-SPEED DETERMINATION OF RECEIVED RF SIGNAL STRENGTH INDICATOR

FIELD OF THE INVENTION

The invention relates to techniques for measuring the amplitude of a radio frequency signal, and more particularly to arrangements for determining received signal strength indicator (RSSI) in a cellular radiotelephone system.

BACKGROUND OF THE INVENTION

The basic structure and operation of a cellular radiotelephone system has been disclosed in a variety of publications. See, for example the January 1979 issue of *The Bell System Technical Journal;* and Specification EIA IS-3-B entitled "Cellular System Mobile Station-Land Station Compatibility Specification" (July, 1984, Electronic Industries Association).

As is well known, the process called "hand off" is a fundamental part of the cellular radiotelephone scheme. A simplified cellular radiotelephone system 10 is shown in FIG. 1. Cellular system 10 includes several fixed RF transceiving stations 12 each serving an associated discrete geographical area ("cell") 14. A central controller 16 supervises and controls the operation of the fixed stations 12. As a mobile station 18 moves from a first "cell" (e.g., cell 14B) to a second "cell" (e.g., 14C), the central controller 16 controls the fixed station 12B serving the first cell 14B to discontinue handling the mobile station's call and controls the fixed station 12C serving the second cell 14C to begin handling the call (and also controls the mobile station to retune to a frequency fixed station 12C operates on). In this way, the mobile station 18 (and its call) is "handed off" to the cell receiving the strongest signal from the mobile station. High quality communications is thus maintained even while mobile station 18 is moving from one cell to another.

System 10 measures the RF signal strength of transmissions of mobile station 18 at the locations of fixed stations 12 in order to decide when a hand off should occur. Decreased received signal strength at a fixed station 12 indicates that the mobile station 18 transmitting the signal is nearing the edge of the cell 14 served by the fixed station and is likely to need handing off to a different cell. Signal strength measurements performed by fixed stations 12 serving adjacent cells are used to determine which cell the call should be handed off to (the call is generally handed off to the cell receiving the mobile station transmission at the highest received signal strength), thus maximizing communications quality and reliability and minimizing the number of hand-offs necessary.

When system design includes partitioned cells (pie-shaped sectors, overlayed cells, etc.), signal strength measurements at fixed stations may also be used to determine which cell partition may best serve particular mobile stations. Signal strength measurements using mobile equipment may be used to verify the RF field strength pattern of fixed station transmissions for purposes of propagation analyses.

As will be appreciated, signal strength measurements are very important in the design and operation of cellular radiotelephone communications systems, and are indeed an essential requirement of cellular equipment design.

Every hand off in a cellular radiotelephone system requires a number of signal strength measurements. Since cellular systems typically serve large numbers of mobile stations, many signal strength measurements are required. Moreover, because mobile stations are usually in motion, the cellular system must respond very rapidly to changes in received signal strength (e.g., by handing off calls) to maintain acceptable signal levels as mobile stations move from cell to cell. There is therefore a great need for fast and accurate received signal strength measuring techniques.

RF signals transmitted by mobile radio stations are subject to Rayleigh fading, as is well known. Fades are of short duration and may be twenty dB or more below the average received signal strength level, making accurate and rapid signal strength measurements difficult to obtain (a measurement made during a deep fade is not representative of the true average received signal strength).

Prior art methods of overcoming this difficulty include analog filtering (equivalent to damping a meter movement so that it does not respond to fast transients) and mathematical averaging of a number of measured samples of received signal strength. Such prior art techniques require several measurements to be taken over a period of time large enough to mask the effects of fading. The number of samples averaged using the averaging technique must be great enough so that measurements made during fades do not unduly influence the resulting average.

Such prior art techniques suffer from at least two disadvantages. First, the extended time period required to obtain accurate measurements using such techniques in is conflict with the requirement that received signal strength measurements must be made as rapidly as possible. Second, it is often desirable to be able to measure sudden changes in the average signal level, such as when the mobile passes behind a large obstacle which "shadows" the antenna. For a rapidly moving vehicle, these changes may occur only a little more slowly than the Rayleigh fading which it is desirable to mask.

Both the averaging and damping techniques of the prior art tend to mask these rapid signal strength changes along with the received signal strength changes attributable to Rayleigh fading phenomenon. As the "damping" (or the number of samples being averaged) is increased to overcome fading effects received signal strength measurement becomes insensitive to other fluctuations in received signal strength which it may be helpful or desirable to measure. As a result the cellular system may respond too slowly to changes in signal strength, allowing the mobile station to receive unacceptable service quality and perhaps even causing the loss of service. Even more important, the excess time required for measurement reduces the number of mobile stations which can be handled, i.e., additional equipment is required to increase system capacity.

The technique disclosed in U.S. Pat. No. 4,549,311 to McLaughlin (Oct. 22, 1985) measures the strength of a RF signal by sampling the signal two or more times during a predetermined time interval and selecting the sampled signal strength having the largest magnitude. The method taught by this McLaughlin patent is essentially a digital implementation of a peak reading meter. The McLaughlin technique always chooses the largest of a plurality of samples (i.e., the peak received signal strength), and therefore is insensitive to received signal strength fluctuation attributable to the values of other measurements in the sampling interval. The technique will begin to detect rapid changes in the average only when a new sampling interval is obtained.

There is great need for an accurate high-speed received signal strength measuring technique which masks the effect of Rayleigh fading, but which is sensitive to received signal strength changes caused-by effects other than Rayleigh fading (e.g., obstacles in the signal transmission path of a moving mobile station).

SUMMARY OF THE INVENTION

The present invention provides a rapid and accurate estimate of the average strength of a radio frequency signal while also masking the effects of Rayleigh fading. Briefly, the instantaneous amplitude of a received radio frequency signal over a sequence of discrete time intervals is sampled. The sampled signal levels which do not exceed at least one of the signal level sampled immediately prior thereto in the sampling sequence and the signal level sampled immediately subsequent thereto in the sequence are discarded. An average is calculated in response to the levels not discarded. This average value is outputted as an indicator of the average received signal strength (RSSI).

The present invention produces a received signal strength indicator which is sensitive to sudden changes in average signal level and can be determined rapidly. Moreover, the number of measurements performed by the present invention may be made small without risking inaccuracy due to the effects of Rayleigh fading on received signal amplitude. Hence a small number of samples can be used to provide an accurate average received signal strength value which is sensitive to rapid changes in the average received signal strength and yet is largely unaffected by deep fades.

BRIEF DESCRIPTION OF THE DRAWINGS

These and other features and advantages of the present invention will be better and more completely understood by studying the following detailed description of presently preferred embodiments together with the appended drawings of which:

FIGS. 3 and 4 are flowcharts of some of the relevant control function steps performed by the embodiment shown in FIG. 2;

DETAILED DESCRIPTION OF PRESENTLY PREFERRED EMBODIMENTS

Figure 1:
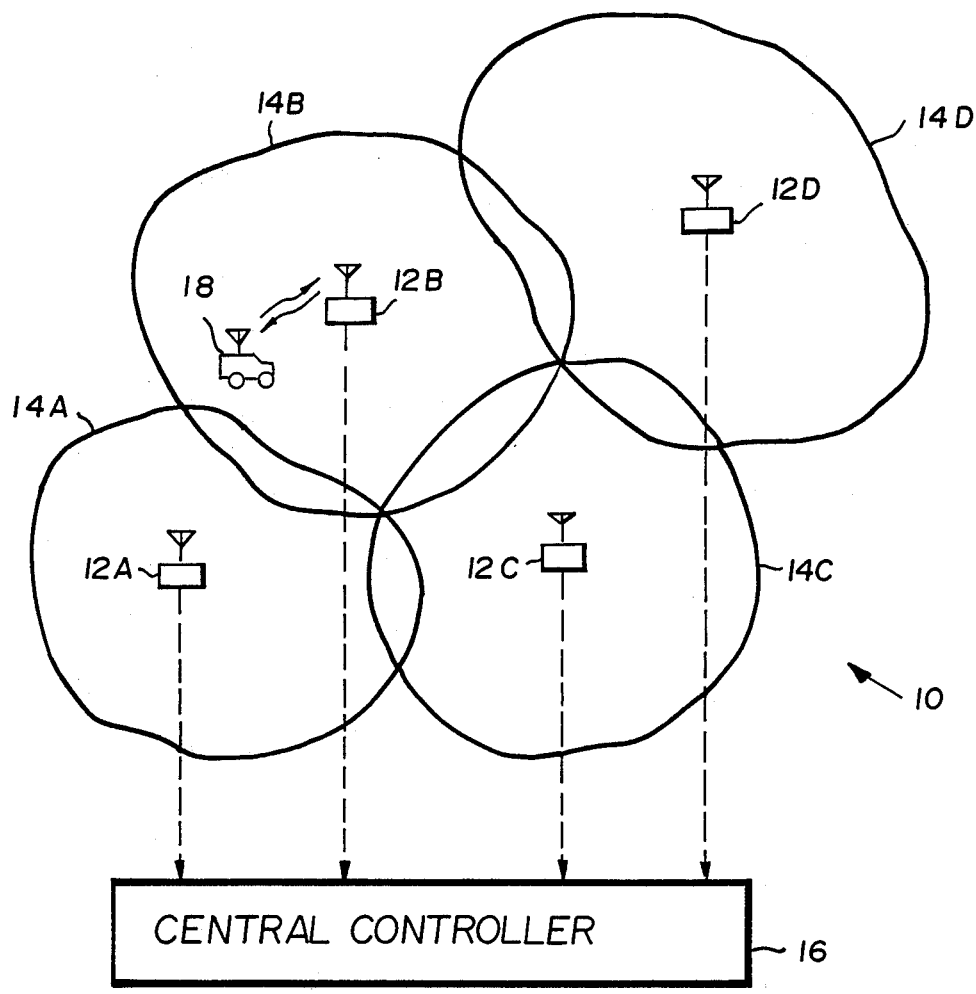
FIG. 1 is a schematic illustration of a simplified cellular radiotelephone communications system.
Figure 2:
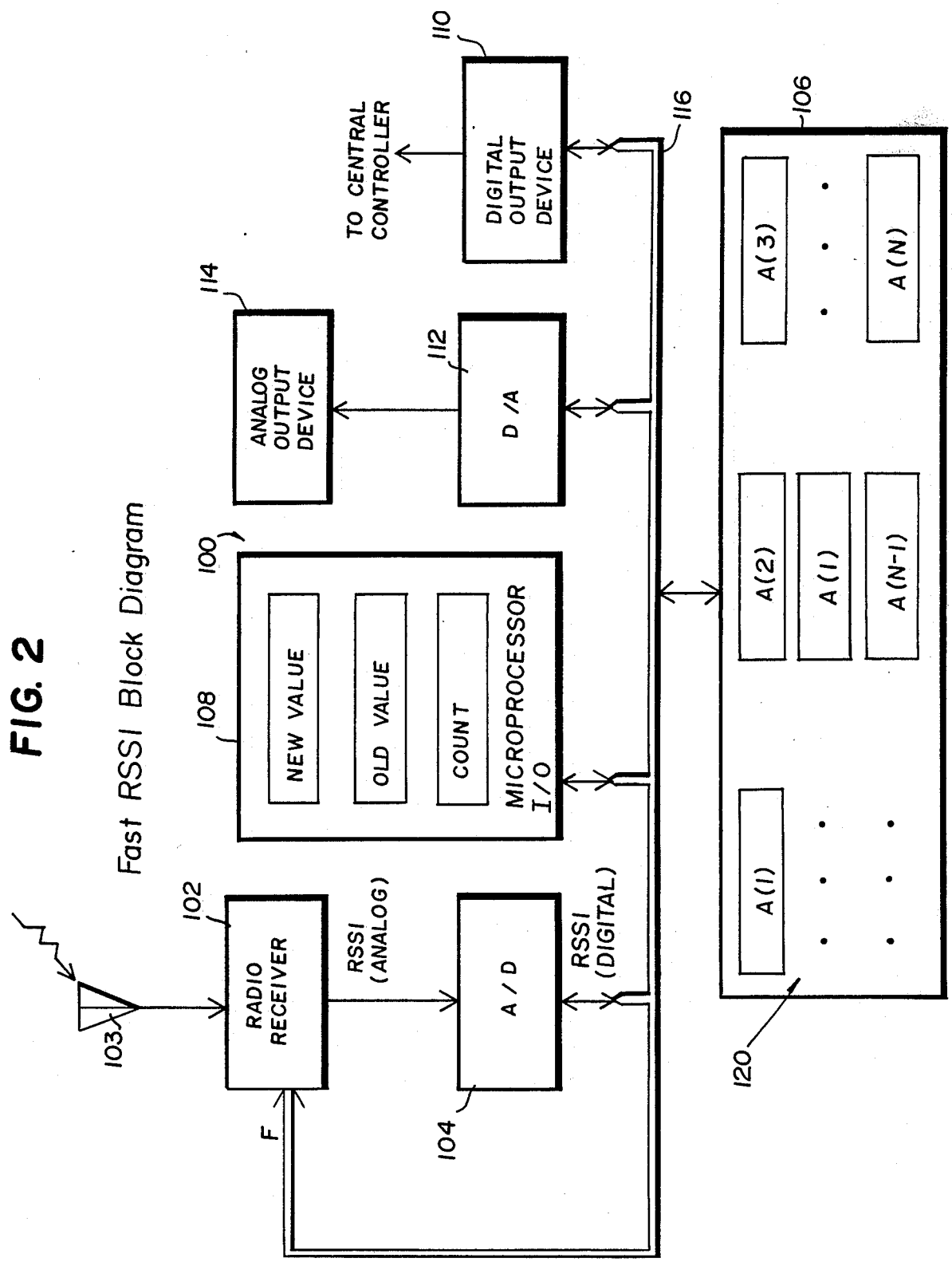
FIG. 2 is a detailed block diagram of the presently preferred exemplary embodiment of an RF received signal strength indicator system in accordance with the present invention.

FIG. 2 is a schematic block diagram of a presently preferred exemplary received signal strength indicator system 100 in accordance with the present invention. The system 100 includes a radio receiver 102, an analog-to-digital (A/D) converter 104, a memory 106, and a digital signal processor 108. System 100 may further include a digital output device 110, a digital-to-analog (D/A) converter 112, and an analog output device 114. In the preferred embodiment, A/D converter 104. D/A converter 112, digital output device 110, processor 108 memory 106 and receiver 102 communicate with one another via a conventional data bus 116.

Radio receiver 102 is a conventional radio receiving device capable of rapidly tuning to any frequency within its operating range and having an analog output which provides a measure of the instantaneous amplitude of radio frequency signals (of a desired frequency) received by an antenna 103 an instantaneous signal strength output has been called the "Received Signal Strength Indicator" (abbreviated RSSI). In the preferred embodiment, receiver 102 comprises a General Electric Cellular Station Radio Channel Unit as described in the GE publication designated LBI 31322; or General Electric Cellular Mobile Radio described in the GE publication designated LBI 31355.

Receiver 102 produces an analog electrical output signal "RSSI", the level of which is a function (e.g., logarithm) of the instantaneous amplitude of radio frequency (RF) signals at the frequency to which the receiver is tuned. The analog output of receiver 102 is applied to the input of conventional A/D converter 104, which converts the analog output to a digital signal. The digital output of A/D converter 104 is applied to an I/O port of processor 108 via bus 116. Processor 108 may also produce digital signals which are applied to a digital input of receiver 102 via bus 116 to control (in a conventional manner) the frequency to which receiver 102 is tuned.

Processor 108 may be any conventional microprocessor and preferably includes a central processing unit internal registers and counters, a clock oscillator, and the like, all of which are well-known. Processor 102 stores digital signals in memory 106, and also reads digital signals from the memory. The processor produces one or more output signals which may be transmitted to central controller 16 via digital output device 110 and/or converted to analog signals (via D/A converter 112) for graphical display on a chart recorder or other display device 114 (e.g., in order to plot signal strength for propagation studies). Processor 108 performs a series of predetermined steps under the control of program instructions stored in a read only memory (not shown) which may be internal or external to the processor.

Receiver 102 monitors a frequency which may be determined by processor 108 and continuously produces an analog RSSI signal. A/D converter 104 converts this RSSI signal to a digital value. A/D converter 104 in the preferred embodiment is of the type which periodically samples the analog RSSI signal and updates the digital value available at its output in response to the then current received RF signal amplitude. In the preferred embodiment, processor 108 periodically reads (samples) the digital value output by A/D converter 104 and stores this value in an internal register NEW VALUE (NV). Thus, the contents of the register NEW VALUE is the current (i.e., most recently sampled) value representing RSSI.

Processor 108 may sample the output of A/D converter 104 at any desired sampling rate slow enough to mask the effects of Rayleigh fading (the fixed sampling rate of the preferred embodiment is chosen to be on the order of the rate of occurrence of Rayleigh fading of the received radio frequency signal). When the processor samples the current RSSI value, it first stores the contents of internal register NEW VALUE into another internal register called OLD VALUE (OV). The internal register OLD VALUE thus contains a previously measured value of RSSI (and, in the preferred embodiment the RSSI value sampled just prior to the most recently sampled value). As will be understood, storage locations in memory 106 could be used instead of internal registers if desired.

Memory 106 stores an array 120 of values A(1), A(2), ... A(i), ... A(N) (where N is a positive integer). This array 120 is stored in memory 106 separately from the OLD VALUE and NEW VALUE registers internal to processor 108. A counter ("COUNTER", or "C") internal to processor 108 is used to address (index) elements of array 120.

Figure 3:
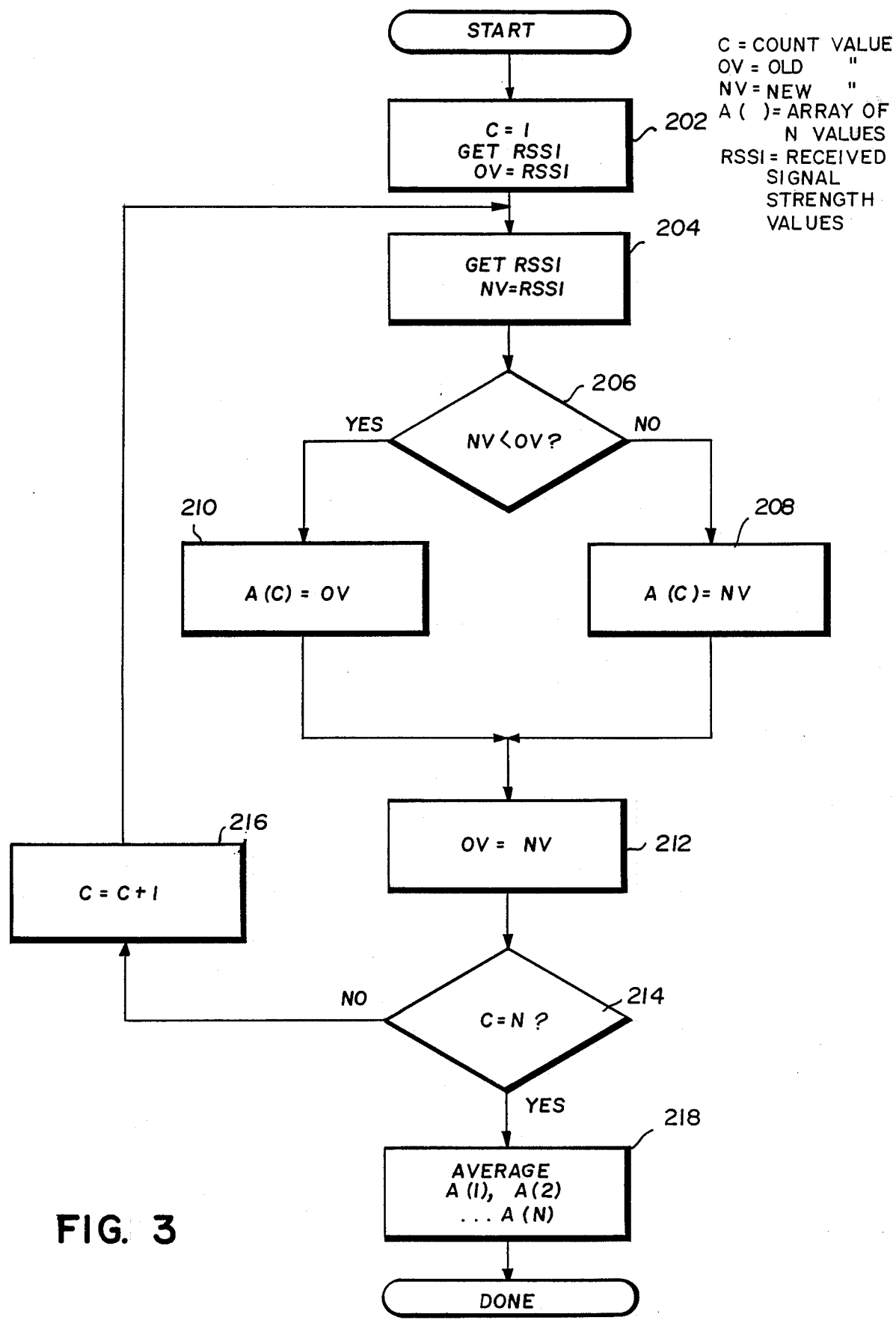

FIG. 3 is a flowchart of the steps performed by preferred embodiment 100. Processor 108 periodically samples the digital output of A/D converter 104 and stores this digital value in internal register NEW VALUE (block 204). However, before the A/D converter output is written into register NEW VALUE the previous contents of the register are (or already have been) stored into internal register OLD VALUE (block 212) (thus overwriting the previous contents of the OLD VALUE register). At any given time internal register NEW VALUE contains the digital value representing the RSSI most recently sampled from the output of A/D converter 104 (e.g., at time $t_i$), and internal register OLD VALUE contains a digital value representing "next most current" RSSI (that is, RSSI is sampled one sample time $t_{i-1}$ prior to the most recent sample time, or at $t_{i-\tau}$ where $\tau$ is a fixed sample period).

Processor 108 next compares the contents of the OLD VALUE register with the contents of the NEW VALUE register (block 206) (for example by executing a conventional "compare" microinstruction which generates a logical value indicating which register contains the largest value). The larger of the two values is stored in the location of array 120 pointed to by the internal COUNTER of processor 108 (blocks 208, 210), and the contents of COUNTER is then incremented (i.e., increased by 1) (block 216).

The process described above continues periodically until the value of COUNTER has reached N (i.e., until all N array elements A(1) - A(N) contain a value of RSSI, as tested for by block 214). That is, processor 108 reads a series of signal amplitude samples $S_1$-$S_{N+1}$ representing instantaneous received RF signal amplitudes at a corresponding sequence of sample times $t_1$-$t_{N+1}$ and stores N values, selected by comparison to adjacent values, into memory 106. Processor 108 then computes an average of the values stored in array 120 by performing the following calculation:

$$AVG = \frac{\sum_{i=1}^{N} A(i)}{N}$$

The calculated value AVG represents RSSI over the time period $t_1$ through $t_{N+1}$. This AVG value may be sent to central controller 16 of the cellular system 10 (via digital output device 110) to facilitate hand off determinations (or could be printed by a printer connected to the output of output device 110) and/or may be output via output device 114 and D/A converter 112.

The value AVG calculated by processor 108 provides a fairly accurate estimate of the actual average value of RF signal amplitude received over the sampling interval $t_1$-$t_{N+1}$. The number of samples may be relatively small without risking that the value AVG will be unduly influenced by a value sampled during a fade. The close correspondence between the value AVG determined in accordance with the present invention and the actual average value of received signal strength may be best understood by referring to FIGS. 5(A) and 5(B).

Figure 5A:
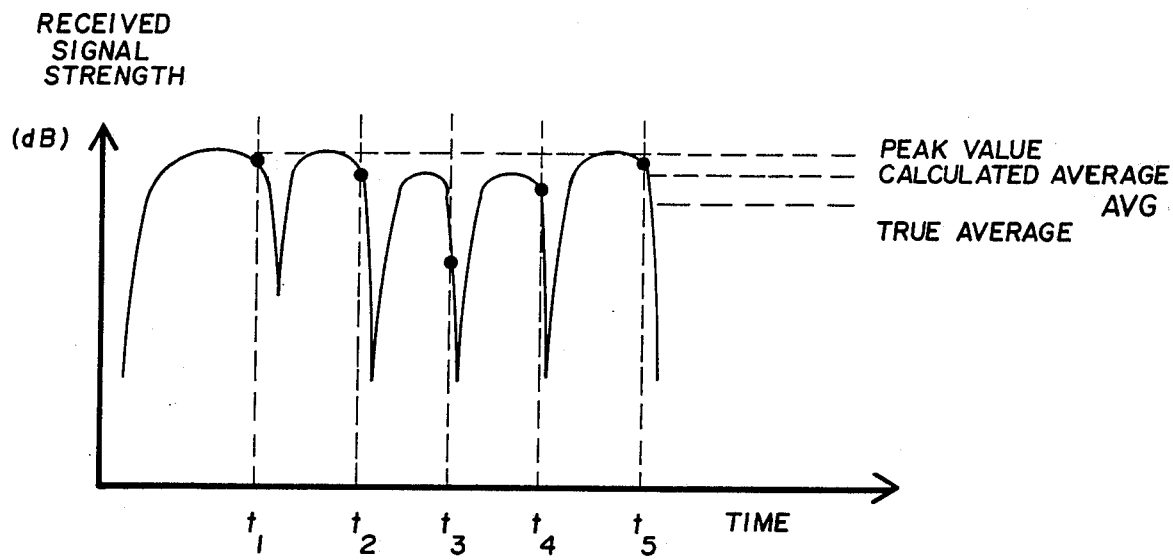
FIGS. 5(A) and 5(B) are graphical illustrations of parameters measured by the embodiment shown in FIG. 2 for two different exemplary received RF signals.

FIG. 5(A) is a graphical illustration of an exemplary received RF signal plotted versus time. The exemplary received RF signal strength shown in FIG. 5(A) is at or near its true average value most of the time, although Rayleigh fading causes it to fall substantially below this average value for short periods.

Assume that the preferred embodiment 100 produces a value AVG based upon five samples (i.e., samples taken at times $t_1$, $t_2$, $t_3$, $t_4$, and $t_5$). Thus, N=4 (since N+1 samples are required to obtain the N values stored in array 120 in the preferred embodiment).

At time $t_1$, the sample value $S_1$ of the received signal first amplitude peak level is stored into internal register OLD VALUE (see block 202 of FIG. 3). Subsequently, at time $t_2$, the amplitude $S_2$ of the received signal is stored in register NEW VALUE (block 204). Because the RSSI at time $t_1$ was greater than the RSSI at time $t_2$, the contents of register OLD VALUE is stored into element A(1) of array 120 (blocks 206, 210). The RSSI existing at time $t_2$ is then loaded from register NEW VALUE into register OLD VALUE (block 212).

Next, a value $S_3$ representing the instantaneous RSSI existing at time $t_3$ is loaded into register NEW VALUE (block 204). Since the RSSI at time $t_2$ (the contents of OLD VALUE) is greater than the RSSI at time $t_3$ (NEW VALUE), the $t_2$ value is loaded into element A(2) of array 120 (blocks 206, 210).

In a similar manner, the value $S_4$ representing RSSI at time $t_4$ is loaded into array element A(3) (since $S_3 < S_4$), and the value $S_5$ representing RSSI at time $t_5$ is loaded into array element A(4) (since $S_4 < S_5$). The value AVG is calculated (block 218) from the values $S_1$, $S_2$, $S_4$ and $S_5$ stored in array 120 (representing RSSI at times $t_1$, $t_2$, $t_4$ and $t_5$, respectively).

The value $S_3$ representing RSSI at time $t_3$ is not used to compute the value AVG, since the two values it has been compared with (the value of RSSI at $t_2$ and the value of RSSI at $t_4$) are both larger than it. In the preferred embodiment, an RSSI value $S_i$ measured for a given sample time $t_i$ which is less than the RSSI value $S_{i-1}$ measured during the immediately preceding sample time $t_{i-1}$ and is also less than the RSSI value $S_{i+1}$ measured during the immediately subsequent sample time $t_{i+1}$ does not affect the calculated average value AVG at all, and is instead discarded. A sample occurring during a Rayleigh fade (e.g., at sample time $t_3$) has little chance of affecting the calculated average value AVG since it most likely will be surrounded by samples not occurring during such a fade (so long as the sample period is chosen to be on the order of the duration of most Rayleigh fades).

It will be observed that the calculated average value AVG is less than the peak signal value and is a closer approximation of the actual average value of the received signal strength than is the peak value.

Figure 5B:
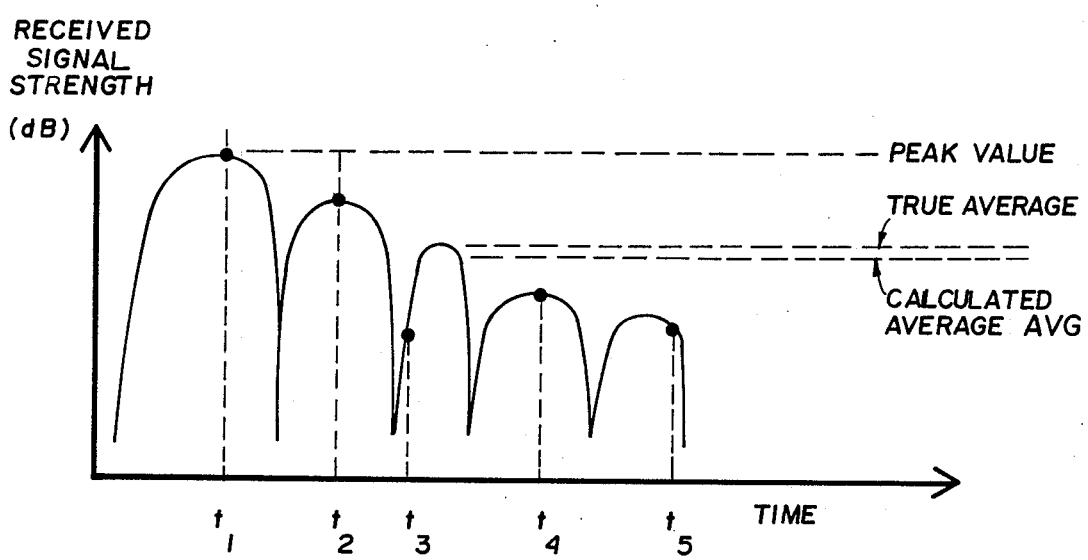

FIG. 5(B) is graphical illustration of the received signal strength (versus time) of an exemplary rapidly changing RF signal. Such a signal might be received from a mobile station entering the "shadow" of a large building. For the signal shown in FIG. 5(B), preferred embodiment 100 stores the value $S_1$ representing RSSI at sample time $t_1$ in array element $A(1)$ ($S_1 > S_2$), the value $S_2$ representing RSSI at time $t_2$ in array element $A(2)$ ($S_2 > S_3$), the value $S_4$ representing RSSI at time $t_4$ in array element $A(3)$ ($S_3 < S_4$), and the value $S_4$ representing RSSI at time $t_4$ in array element $A(4)$ ($S_4 > S_5$). The value representing RSSI at time $t_4$ is stored twice (into both array elements $A(3)$ and $A(4)$) because it is greater than the values representing RSSI at times $t_3$ and $t_5$.

The peak value of the received amplitude of the signal shown in FIG. 5(B) is substantially greater than the true average received signal amplitude due to the rapidly changing (decreasing in the example shown) characteristic of the signal. The value AVG calculated in accordance with the present invention nevertheless provides a relatively accurate approximation of the true average value even based on a relatively small number of samples (five in the example described).

The calculated average value AVG is sensitive to rapid changes in the average received signal strength and yet is not unduly influenced by deep fades of short duration. The number of samples $N+1$ upon which the average value AVG is based determines the sensitivity of the calculated average value AVG to rapid changes in average received signal strength (e.g., a large value of N will make the calculated average value AVG relatively insensitive to rapid changes, while small N causes the value AVG to be more sensitive to rapid changes).

To ensure an adequate and consistent number of samples in any fixed interval of time, the present invention occasionally stores a value representing RSSI at a given sample time into two elements of array 120. For the exemplary signal shown in FIG. 5(B), the preferred embodiment stores the value representing RSSI at sample time $t_4$ twice, causing the calculated average value AVG to be biased slightly. This biasing is intentional and desirable for the following reasons. If the value sampled at time $t_4$ were not used twice (e.g., if a value representing RSSI at any given sample time could be stored into only one element of array 120 at most), the calculated average value AVG would be based upon fewer measured values (assuming a fixed number of samples are performed over a fixed interval of time). A further sample at a time $t_6$ later than time $t_5$ would then be necessary to determine whether RSSI measured at sample time $t_5$ should be stored into array 120 (as can be seen, the value representing RSSI at time $t_4$ is a better estimator of the average received signal strength than the value measured at time $t_3$ or $t_5$). The preferred embodiment 100 never stores an RSSI value obtained from a given sample into more than two elements of array 120.

A process which gathers extra samples (e.g. at time $t_6$) to make up for omitted samples extends the time required to obtain a result, and is therefore undesirable. It is possible to use sample periods of variable length (e.g., to sample again at $t_5 + \Delta t < t_5 + \tau$, where $\tau$ is the nominal sample period, if the RSSI value measured at time t is to be discarded), but additional complexity would be introduced which probably would not significantly improve the results obtained.

Preferred embodiment 100 provides excellent results when used, for example, in a cellular locating receiver which is required to perform rapid measurements on a number of different channels. In such device, receiver 102 is directed by processor 108 to tune to each of a predetermined sequence of channels, and to perform the steps shown in FIG. 3 on each channel.

Sometimes, however, it is necessary to perform RSSI measurements repetitively while receiver 102 is tuned to a single channel. For example, a mobile station measuring propagation of a fixed station probably should remain tuned to a single frequency for the entire duration of the propagation test. The preferred embodiment 100 can be modified slightly to calculate a rolling average and to thus output a calculated average value AVG for each and every sample period if desired.

FIG. 4 is a flowchart of steps which provide a rolling average of RSSI in accordance with the present invention. The contents of the COUNTER internal to processor 108 is reset to 1 whenever its contents are incremented to greater than N (blocks 224, 226). An accurate calculated average value AVG is first available as soon as $N+1$ samples have been read by processor 108, and can be calculated accurately at any time thereafter (e.g., on demand, after every sample time, or at any other convenient interval) (blocks 222, 218). The sample size $N+1$ may be chosen to adjust the sensitivity of the measurement to rapid changes, and samples occurring during fades will not unduly influence the value of AVG.

Figure 3A:
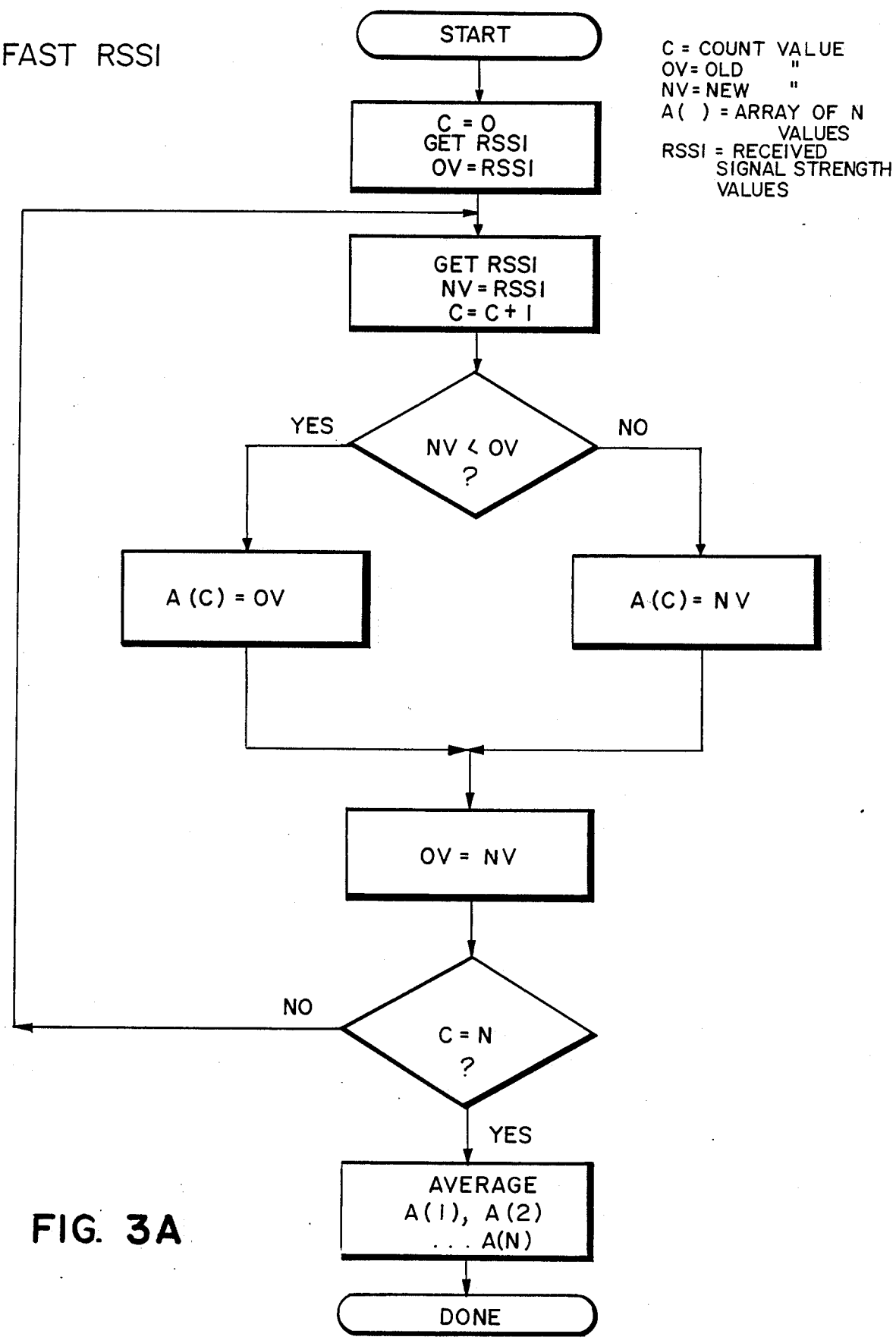
FIGS. 3(A) and 4(A) are flowcharts of some of the relevant control function steps performed by a further presently preferred embodiment of the present invention.
Figure 4A:
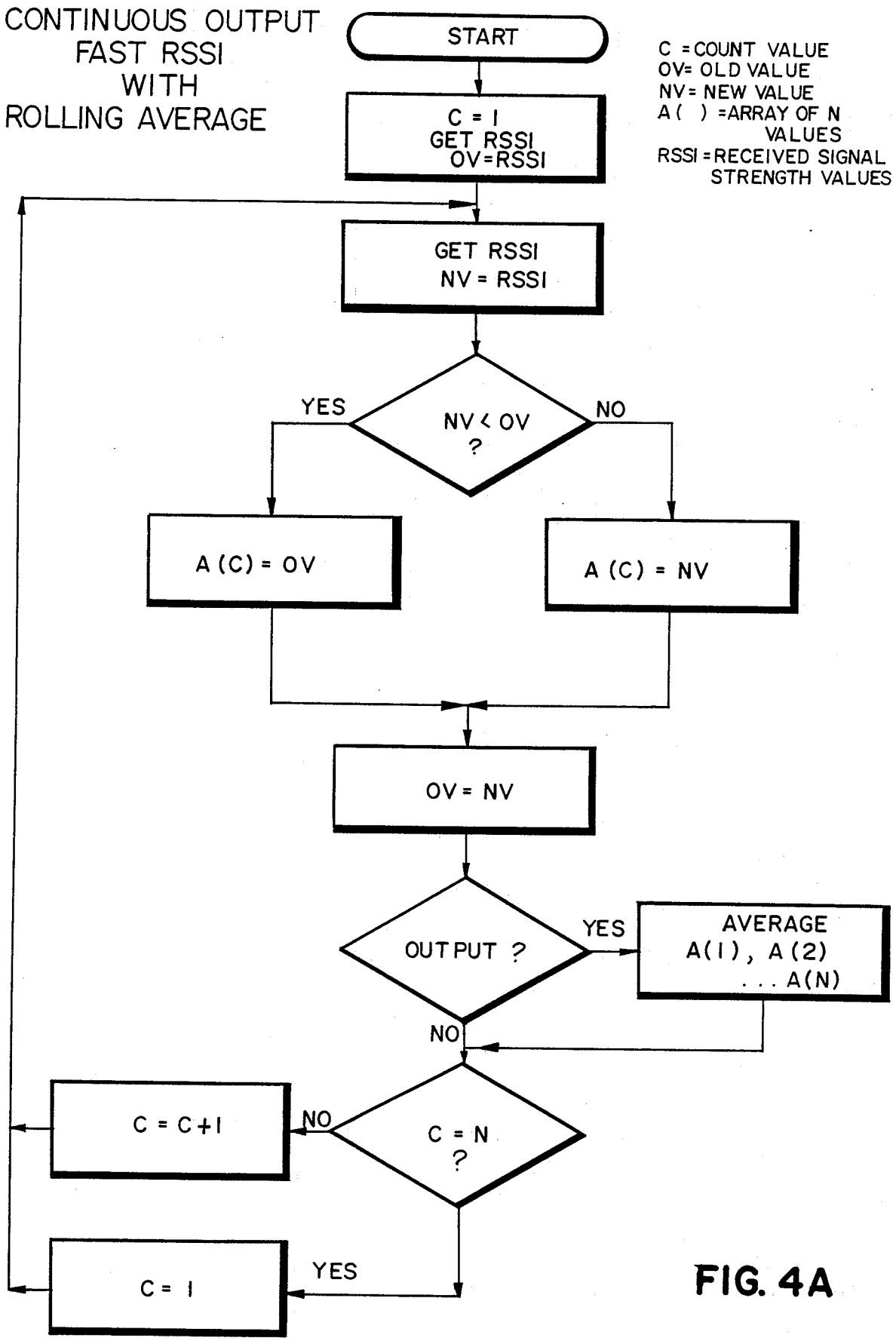

FIGS. 3(A) and 4(A) are additional, modified flowcharts showing steps which perform the same basic calculations as do the steps shown in FIGS. 3 and 4.

The advantages and improvements the present invention provides over the prior art techniques for measuring RSSI should now be apparent. The present invention provides better accuracy by eliminating readings in deep fades and averaging the values that are left. The technique disclosed in U.S. Pat. No. 4,549,311 to McLaughlin would merely select peak RSSI value occurring at time $t_1$ for the exemplary signals shown in both FIGS. 5(A) and 5(B). The average value AVG determined in accordance with the present invention is much closer to the true average signal level for each of these exemplary signals.

Although a peak reading may be closer to the true average than a reading taken during a deep fade, the difference between peak received signal strength and average received signal strength is significant in many (if not most) cases. The peak approximation is not accurate for received signals which fluctuate in strength due to factors other than Rayleigh fading. The present invention calculates a value which is sensitive to these other factors as well as more accurately estimating the average received signal strength (while also excluding measurements taken during deep fades), and therefore provides a far more accurate indication of average received signal strength.

While the present invention has been described with what is presently considered to be the most practical and preferred embodiments, it is to be understood that the appended claims are not to be limited to the disclosed embodiments, but on the contrary, are intended to cover all modifications, variations and/or equivalent arrangements which retain any of the novel features and advantages of the invention. By way of non-limiting example, analog techniques and structures could be substituted for the various digital techniques and structures of the preferred embodiment (e.g., analog sample and hold circuits may be used to store analog RSSI values, and operational amplifier techniques may be used to obtain a signal representing an average of a plurality of analog signal levels). Processor 108 can, of course, perform many other functions as well as the steps shown in FIG. 3. If desired, all sampled RSSI values could be stored in memory 106 and the analysis of the present invention could be performed on the stored values (such analysis not being performed in real time, could begin at the end of the stored sequence and compare values sampled later with those sampled earlier). Alternatively, memory 106 could be eliminated and a running sum of selected sampled values could be maintained. Moreover, the signal processing steps of the present invention can be implementing using hardware, software, firmware or any combination of these.

What is claimed is:

1. A radio receiving device of the type including means for receiving a radio frequency signal subject to Rayleigh type fading effects on a radio frequency channel, said receiving device further comprising:

signal producing means operatively coupled to said receiving means for producing a first signal representing the instantaneous amplitude of said signal received on said radio frequency channel;

sampling means, connected to said signal producing means, for repetitively sampling the level of said first signal over a sequence of discrete time intervals to thereby produced a chronological sequence of sampled levels representing the instantaneous amplitude over time of said received radio frequency signal; and control means, connected to said sampling means, for selecting all sampled signal levels exceeding (a) sampled signal levels immediately before said selected sampled levels in said chromological sequence and/or (b) sampled signal levels immediately following said selected sample levels in said chronological sequence, and for producing an output signal responsive to said selected sampled signal levels which represents an average amplitude of said received radio frequency signal over time and is insensitive to said Rayleigh fading effects.

2. A digitally-controlled receiving device comprising:

radio signal receiving means for receiving a radio frequency signal on a radio frequency channel, said radio frequency signal being subject to Rayleigh fading effects, and for continually producing, at an output thereof, a first signal indicating the amplitude of said radio frequency signal on said radio frequency channel;

digital memory means, connected to receive said first signal, for storing a sequence of values of said first signal associated with a corresponding sequence of discrete time intervals; and digital control means, connected to said memory means, for averaging the ones of said stored first signal values indicating amplitudes which exceed at least one of the stored first signal values prior to said selected signal values in said sequence and the stored first signal values following said selected signal values in said sequence and for providing a resulting average which is insensitive to said Rayleigh fading effects.

3. A method of determining the average amplitude of a radio frequency signal subject to Rayleigh fading effects comprising the steps of:

(1) measuring the instantaneous amplitude of a radio frequency signal;

(2) after a predetermined time period has elapsed since the signal amplitude was last measured, again measuring said instantaneous signal amplitude;

(3) storing a value representing the larger of the two signal amplitudes most recently measured by said steps (1) and/or (2);

(4) repeating said steps (2) and (3) at least once; and (5) averaging the values stored by said storing step (3) to provide a value which indicates the average of said radio frequency signal amplitude and which is insensitive to Rayleigh fading of said radio frequency signal.

4. A method as in claim 3 wherein said repeating step (4) comprises the steps of repeating said steps (2) and (3) a predetermined number of times.

5. A method as in claim 3 wherein:
said repeating step (4) is performed continuously; and
said averaging step (5) includes the step of averaging only the last N values stored by said storing step (3), N being a predetermined integer.

6. A method of determining the average level of a radio frequency signal comprising the steps of:

(1) sampling instantaneous levels $S_1$-$S_{N+1}$ of a radio frequency signal occurring at a corresponding series of discrete times $t_1$-$t_{N+1}$, N being an integer;

(2) comparing a signal level $S_i$ sampled by said sampling step at a time $t_i$, $t_1 < t_i < t_{N+1}$, with a further signal level $S_{i+1}$ sampled by said sampling step (1) at a time $T_{i+1}$ immediately following said time $t_i$ in said series, i being an integer;

(3) selecting the larger of the two sampled signal levels compared by said comparing step (2);

(4) repeating said comparing and selecting steps (2) and (3) for each of said sampled signal levels $S_1$-$S_N$; and (5) averaging said levels selected by said selecting step (3).

7. A method as in claim 6 wherein said selecting step (3) includes the step of selecting any sampled signal level $S_i$ no more than twice.

8. A method as in claim 6 wherein said selecting step (3) further includes the step of not selecting any sampled signal level $S_i$ which is less than a signal level $S_{i-1}$ sampled at an immediately preceding time $t_{i-1}$ in said series and is also less than a signal level $S_{i+1}$ sampled at an immediately succeeding time $T_{i+1}$ in said series.

9. A method as in claim 6 wherein said sampling step (1) comprises the step of periodically sampling said radio frequency signal at a fixed sampling rate on the order of the rate of occurrence of Rayleigh fading of said radio frequency signal.

10. A method as in claim 6 wherein said sampling step (1) comprises the step of periodically sampling said signal a fixed number of times N+1 over a fixed time period.

11. In a radio receiving device of the type including tunable radio frequency receiving means for receiving a radio frequency signal of a preset frequency and for producing an RSSI signal responsive to the instantaneous amplitude of said received signal, a digital signal processor connected to control said receiving means and programmed so as to perform the following functions:

tune said receiving means to a predetermined radio frequency;

sampling instantaneous levels $S_1$-$S_{n+1}$ of said RSSI signal occurring at a corresponding series of discrete times $t_1$-$t_{N+1}$, N being an integer;

compare a signal level $S_i$, for $1 \leq i \leq N$ with i being an integer, sampled at a corresponding time $t_i$ with a further signal level $S_{i+1}$ sampled at a corresponding time $t_{i+1}$ immediately following said time $t_i$ in said series;

select the larger of the two compared sampled signal levels for each integer value of i, $1 \leq i \leq n$; and output a digital signal responsive to the average of said selected levels.

12. A digitally-controlled receiving device comprising:

a radio signal receiving means for receiving a signal subject to Rayleigh fading effects on a first radio frequency over a period of time and for producing a successive sequence of digital signals indicating the amplitude of said signal received on said same first radio frequency at a corresponding sequence of successive discrete time intervals during said time period;

digital signal selecting means, connected to receive said sequence of digital signals, for selecting digital signals from certain time intervals, said selected signals exceeding at least one of: (1) the digital signals corresponding to the time intervals prior to the certain time intervals, and (2) the digital signals corresponding to the time intervals following the certain time intervals; and averaging means for averaging said selected signals to produce a result, said result indicating an average received signal strength of said radio frequency signal on said same first radio frequency, said average being insensitive to said Rayleigh fading effects.

13. A method as in claim 6 wherein said selecting step (3) includes the step of selecting at least one of said sampled levels $S_i$ twice.

14. A device as in claim 1 wherein said control means selects any given sampled level M times, M being an integer within the range of $0 \leq M \leq 2$.

15. A device as in claim 2 wherein:

said control means accumulates a sum and calculates an average in response to said sum, and said control means adds none of said stored signals to said sum more than twice, and does not add at least one of said stored signals to said sum.

16. A device as in claim 12 wherein said control means selects at least one of said stored signals twice, selects none of said stored signals more than twice, and does not select at least one of said stored signals.

17. A digital radio communications device including:

radio frequency receiving means for receiving a radio frequency signal subject to Rayleigh fading effects at a certain radio frequency;

sampling means connected to said receiving means for sampling the amplitude of said received signal a plurality of times to provide a sequence of successive sampled values; and processing means connected to said sampling means for comparing the sampled values of each pair of adjacent-in-time successive sampled values in said sequence and for calculating an average received signal strength value based on sampled values which said comparisons reveal exceed corresponding adjacent-in-time sampled values, said calculated average received signal strength value being insensitive to said Rayleigh fading effects.

18. In a digital radio communications device of the type including a radio frequency receiver for receiving a radio frequency signal, a method of determining an average amplitude of said received radio frequency signal subject to Rayleigh fading effects comprising the steps of:

(a) sampling the amplitude of said received signal to provide a sampled amplitude of OLD VALUE;

(b) subsequent to said sampling step (a), again sampling the amplitude of said received signal to provide a further sampled amplitude NEW VALUE;

(c) comparing said NEW VALUE and OLD VALUE sampled amplitudes;

(d) selecting the one of said NEW VALUE and OLD VALUE sampled amplitudes said comparison reveals exceeds the other of said NEW VALUE and OLD VALUE sampled amplitudes;

(e) replacing said OLD VALUE sampled amplitude with said NEW VALUE sampled amplitude;

(f) repeating said steps (b)–(e) a plurality of times to provide a corresponding plurality of selected sampled amplitudes; and (g) averaging said sampled amplitudes selected by said selecting step (d) to provide an average which is insensitive to said Rayleigh fading effects.

19. A method as in claim 18 wherein:

said selecting step (d) includes storing said selected sampled amplitudes in a memory; and said averaging step (g) comprises averaging plural sampled amplitudes stored in said memory.

20. A method as in claim 18 wherein said repeating step (f) includes repeating said sampling step (b) at a rate on the order of the rate of occurrence of said Rayleigh fading in said received signal.

21. A method as in claim 18 wherein said repeating step (f) includes a periodically repeating said sampling step (b) at a fixed rate on the order of the rate of occurrence of said Rayleigh fading in said received signal.

22. In a digital radio communications device of the type including a radio frequency receiver for receiving a radio frequency signal to Rayleigh fading effects, a method of determining an average received signal amplitude of said received radio frequency signal comprising the steps of:

(a) sampling the amplitude of said received signal to provide a first sampled amplitude;

(b) subsequent to said sampling step (a), again sampling the amplitude of said received signal to provide a further sampled amplitude;

(c) comparing said first and further sampled amplitudes;

(d) selecting said further sampled amplitude if said comparing step (c) reveals said further amplitude exceeds said first sampled amplitude;

(e) selecting said first sampled amplitude if said comparing step (c) reveals said first sampled amplitude exceeds said further sampled amplitude;

(f) subsequent to said sampling step (b), again sampling the amplitude of said received signal to provide a still further sampled amplitude;

(g) comparing said further and still further sampled amplitudes:

(h) selecting said further sampled amplitude if said comparing step (g) reveals said further amplitude exceeds said still further sampled amplitude;

(i) selecting said still further sampled amplitude if said comparing step (g) reveals said still further sampled amplitude exceeds said further sampled amplitude; and (j) averaging said sampled amplitudes selected by said selecting steps to provide an average which is insensitive to said Rayleigh fading effects.

* * * * *